(12) United States Patent
Farrier

(10) Patent No.: US 11,662,997 B2
(45) Date of Patent: May 30, 2023

(54) SYSTEMS AND METHODS FOR SOFTWARE AND DEVELOPER MANAGEMENT AND EVALUATION

(71) Applicant: Appsurify, Inc., Los Angeles, CA (US)

(72) Inventor: James Farrier, Auckland (NZ)

(73) Assignee: Appsurify, Inc., Los Angeles, CA (US)

( * ) Notice: Subject to any disclaimer, the term of this patent is extended or adjusted under 35 U.S.C. 154(b) by 0 days.

(21) Appl. No.: 17/180,317

(22) Filed: Feb. 19, 2021

(65) Prior Publication Data

US 2021/0263728 A1   Aug. 26, 2021

Related U.S. Application Data

(60) Provisional application No. 62/979,013, filed on Feb. 20, 2020.

(51) Int. Cl.
*G06F 8/71* (2018.01)
*G06F 17/18* (2006.01)
*G06F 11/36* (2006.01)

(52) U.S. Cl.
CPC ............ *G06F 8/71* (2013.01); *G06F 11/3688* (2013.01); *G06F 17/18* (2013.01)

(58) Field of Classification Search
CPC ......... G06F 8/71; G06F 11/3688; G06F 17/18
See application file for complete search history.

(56) References Cited

U.S. PATENT DOCUMENTS

| 7,503,037 | B2* | 3/2009 | Banerjee | G06F 11/3676 |
| | | | | 717/124 |
| 9,141,378 | B2* | 9/2015 | Fox | G06F 8/71 |
| 9,268,665 | B2* | 2/2016 | Barrow | G06F 8/77 |
| 9,542,176 | B2* | 1/2017 | Bird | G06F 8/71 |
| 10,713,594 | B2 | 7/2020 | Szeto | |
| 11,455,566 | B2* | 9/2022 | Sobran | G06N 5/04 |
| 2009/0070734 | A1* | 3/2009 | Dixon | G06F 11/3616 |
| | | | | 717/122 |
| 2014/0053135 | A1* | 2/2014 | Bird | G06F 8/71 |
| | | | | 717/124 |

(Continued)

OTHER PUBLICATIONS

Alenezi, M, et al., Efficient Bug Triaging Using Text Mining, Academy Publisher, 2185, 2013.

(Continued)

*Primary Examiner* — Douglas M Slachta
(74) *Attorney, Agent, or Firm* — Riverside Law LLP

(57) ABSTRACT

A method of calculating a failure probability of a change in one or more source code repositories comprises analyzing at least one commit made to the source code repositories, determining a type of the commit selected from a fixing commit and a new code commit, if the commit is a new code commit, determining a set of areas of source code modified, if the code is a fixing commit, determining which commit of a plurality of new code commits is the causing commit, analyzing the commit message and calculating one or more parameters of the commit message, training a machine learning classifier with the set of data, and using the machine learning classifier to calculate a probability that the commit will cause a failure in the source code repository. Methods and systems for task assignment and test selection are also described.

16 Claims, 3 Drawing Sheets

(56) References Cited

U.S. PATENT DOCUMENTS

| | | | |
|---|---|---|---|
| 2016/0034270 A1* | 2/2016 | Swierc | G06F 11/3668 717/126 |
| 2016/0335555 A1* | 11/2016 | Llanes-Tosar | G06F 11/0706 |
| 2017/0139819 A1* | 5/2017 | D'Andrea | G06F 11/3692 |
| 2018/0267886 A1* | 9/2018 | Durga | G06N 20/00 |
| 2019/0287029 A1* | 9/2019 | Sobran | G06F 11/362 |
| 2021/0073107 A1* | 3/2021 | Sharma | G06F 11/3688 |

OTHER PUBLICATIONS

Dedik, V, Automatic Ticket Triage Using Supervised Text Classification, Masters Thesis, Masaryk University, 2015.

Ghaffarian, S, et al., Software Vulnerability Analysis and Discovery Using Machine-Learning and Data-Mining Techniques: A Survey, ACM Computing Surveys, vol. 50, No. 4, Article 56, 2017.

L. P. Hattori and M. Lanza, "On the nature of commits," 2008 23rd IEEE/ACM International Conference on Automated Software Engineering—Workshops, 2008, pp. 63-71, doi: 10.1109/ASEW.2008.4686322.

Adrian Schröter, Thomas Zimmermann, and Andreas Zeller. 2006. Predicting component failures at design time. In Proceedings of the 2006 ACM/IEEE international symposium on Empirical software engineering (ISESE '06). Association for Computing Machinery, New York, NY, USA, 18-27. https://doi.org/10.1145/1159733.1159739.

Maximilian Stoerzer, Barbara G. Ryder, Xiaoxia Ren, and Frank Tip. 2006. Finding failure-inducing changes in java programs using change classification. In Proceedings of the 14th ACM SIGSOFT international symposium on Foundations of software engineering (SIGSOFT '06/FSE-14). Association for Computing Machinery, New York, NY, USA, 57-68. https://doi.org/10.1145/1181775.1181783.

Strandberg, Per & Afzal, Wasif & Ostrand, Thomas & Weyuker, Elaine & Sundmark, Daniel. (2017). Automated System-Level Regression Test Prioritization in a Nutshell. IEEE Software. 34. 30-37. 10.1109/MS.2017.92.

Xia, Xin; David Lo; Wang, Xinyu; and Zhou, Bo. Dual Analysis for Recommending Developers to Resolve Bugs. (2015). Journal of Software: Evolution and Process. 27, (3), 195-220. Research Collection School of Computing and Information Systems.

C. Zhu, Z. Zhu, Y. Xie, W. Jiang and G. Zhang, "Evaluation of Machine Learning Approaches for Android Energy Bugs Detection With Revision Commits," in IEEE Access, vol. 7, pp. 85241-85252, 2019, doi: 10.1109/ACCESS.2019.2925350.

\* cited by examiner

SYSTEMS AND METHODS FOR SOFTWARE AND DEVELOPER MANAGEMENT AND EVALUATION

CROSS-REFERENCE TO RELATED APPLICATIONS

This application claims priority to U.S. Provisional Patent Application No. 62/979,013, filed on Feb. 20, 2020, incorporated herein by reference in its entirety.

BACKGROUND OF THE INVENTION

Modern software development is a collaborative and iterative process, typically involving multiple developers working together to develop a single application or set of applications. In order to make such a collaboration possible, version control systems are used to track and merge changes to source files and libraries. Additionally, quality assurance (QA) tests are written during all stages of development of the application itself in order to test different aspects of the software during development. Using these two systems in tandem, a software team can quickly detect, isolate, and fix any mistakes or bugs that arise during software development.

As the size of an application grows, the number of tests and developers becomes difficult to efficiently maintain. For example, in some cases a development team may need to run all available tests on a code base before allowing one or more changes to be deployed. When the full suite of tests takes multiple hours or days to complete, such a testing regime can become impossibly cumbersome, even as it may seem completely necessary to be safe.

Another challenge in continuous testing is the so-called "flaky failure," an automated test failure caused by a failure of the test itself instead of a defect in the code. A defining feature of a flaky failure is that running the same test multiple times will pass sometimes and fail other times. "Invalid tests" are broken tests that will always fail. An invalid test may look for functionality in an application which is not supposed to exist, for example an outdated test checking for functionality that once existed but has now changed. For example, a test may check that a button called "Login" exists, but that button may have changed to read "Sign In." In such a situation, the test is no longer testing how the application should behave, but rather how it used to. In currently available automated testing environments, there is no easy way to differentiate between a test that fails due to a mistake in the code, a problem executing the test, or a test that no longer matches the code being tested.

Another challenge in multi-developer teams is measuring the quality and efficiency of various developers as they work together on multiple improvements to multiple different parts of the code base of an application. While a single developer working on a smaller project may easily be able to tell which code change is responsible for a given test failure, isolating the responsible code change can be extremely difficult in larger projects involving multiple developers, where many changes may have been committed before a test is run. Other metrics including coding efficiency and proficiency with different parts of the code can be difficult to measure. If a particular task is assigned to the wrong developer on a team (who might be better suited to a different task), the entire project can suffer as deadlines are pushed back to accommodate the additional unnecessary development time.

Therefore, there is a need in the art for improved systems and methods for automated QA and error detection in computer software development, allowing for more efficient testing of code, better evaluation of the developers themselves, and better assignment of future programming tasks. The present invention satisfies this need.

SUMMARY OF THE INVENTION

In one aspect, a method of calculating a failure probability of a change in one or more source code repositories comprises selecting the one or more source code repositories, analyzing the source files in the source code repositories, analyzing at least one commit made to the source code repositories, the commit comprising one or more changes to the source code and a commit message, determining a type of the commit selected from the group consisting of a fixing commit and a new code commit, if the commit is a new code commit, determining a set of areas of source code modified, if the code is a fixing commit, determining which commit of a plurality of new code commits is a causing commit, which caused a defect affiliated with the fixing commit, analyzing the commit message and calculating one or more parameters of the commit message, training a machine learning classifier with a set of data comprising the type of commit, the set of areas modified, the causing commit, and the commit message, and using the machine learning classifier to calculate a probability that the commit will cause a failure in the source code repository.

In one embodiment, the method further comprises the step of stemming and lemmatizing the commit message. In one embodiment, the set of data further comprises the closing commit, a list of files modified, a set of similarly named files, folders, areas, and a list of files and areas associated with the test. In one embodiment, the method further comprises calculating a set of probabilities that parts of a commit will cause a failure. In one embodiment, the method further comprises displaying a heat map representing the set of probabilities. In one embodiment, the method further comprises stratifying the set of probabilities into high risk, medium risk, low risk, and no change. In one embodiment, the method further comprises transmitting a message to one or more recipients if the calculated probability exceeds a threshold.

In one embodiment, the method further comprises removing variable and method names from the changes to the source code in the commit to generate a genericized source code change, and comparing the genericized source code change to other genericized source code changes.

In another aspect, a method of determining whether or not to run a test on a code repository comprises receiving at least one new commit to the code repository, determining which areas of code are changed by the commit, analyzing the commit message, determining the failure probability for the test, comparing the failure probability to a threshold, and if the failure probability exceeds the threshold, running the test.

In one embodiment, the method further comprises determining whether a failure of the test will be unique. In one embodiment, the method further comprises calculating a likelihood of whether the test will cause a unique failure. In one embodiment, the method further comprises recording whether the new commit caused the test to change state, wherein the state is selected from the group consisting of passed, failed, and broken, and using the state change information in a future iteration of the failure probability determining step.

In one embodiment, the method further comprises recording a failure message returned by the test if the test fails, and using the failure message returned by the test in a future iteration of the failure probability test. In one embodiment, the method further comprises, if the new commit caused the test to change state from failed to passed, recording the commit as a "closed-by" commit. In one embodiment, the method further comprises generating a list of tests to be run on the code repository. In one embodiment, the list of tests of be run is a list of a predetermined number of highest priority tests.

In another aspect, a method of assigning a task to one or more developers comprises accepting a new task, determining which areas of code are modified by the task, determining the types of change needed for the task, calculating at least one developer productivity metric of the one or more developers based on past performance of the one or more developers when working in the areas of code or the types of change, and assigning the task to a selected developer of the one or more developers based on the at least one productivity metric.

In one embodiment, the developer productivity metric comprises at least one parameter selected from a code change risk assessment, a time taken to write a section of code, and a number of defects created in past code changes. In one embodiment, the method further comprises generating at least one award for a developer, selected from the group consisting of most productive, most improved productivity, and fewest defects created. In one embodiment, the method further comprises calculating a first developer productivity metric of a first developer when changing code recently written by a second developer, calculating a second developer productivity metric of a second developer when changing code recently written by the first developer, and if the first and second developer productivity metrics exceed a threshold, assigning the first developer and the second developer to a development team.

In another aspect, a system for calculating a failure probability of a change in one or more source code repositories comprises a non-transitory computer-readable medium with instructions stored thereon, which when executed by a processor, perform steps comprising selecting the one or more source code repositories, analyzing the source files in the source code repositories, analyzing a commit made to the source code repositories, the commit comprising one or more changes to the source code and a commit message, determining a type of the commit selected from the group consisting of a fixing commit and a new code commit, if the commit is a new code commit, determining a set of areas of source code modified, if the code is a fixing commit, determining which commit of a plurality of new code commits is a causing commit, which caused a defect affiliated with the fixing commit, analyzing the commit message and calculating one or more parameters of the commit message, training a machine learning classifier with the type of commit, the set of areas modified, the causing commit, and the parameters of the commit message, and using the machine learning classifier to calculate a probability that the commit will cause a failure in the source code repository.

In another aspect, a system for determining whether or not to run a test on a code repository comprises a non-transitory computer-readable medium with instructions stored thereon, which when executed by a processor, perform steps comprising receiving at least one new commit to the code repository, determining which areas of code are changed by the commit, analyzing the commit message, determining the failure probability for the test, comparing the failure probability to a threshold, and if the failure probability exceeds the threshold, running the test.

In another aspect, a system for assigning a task to one or more developers comprises a non-transitory computer-readable medium with instructions stored thereon, which when executed by a processor, perform steps comprising accepting a new task, calculating at least one developer productivity metric of the one or more developers based on past performance of the one or more developers, determining which areas of code are modified by the task, determining the types of change needed for the task, and assigning the task to a selected developer of the one or more developers based on the productivity metric.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which.

DETAILED DESCRIPTION

Figure 1:
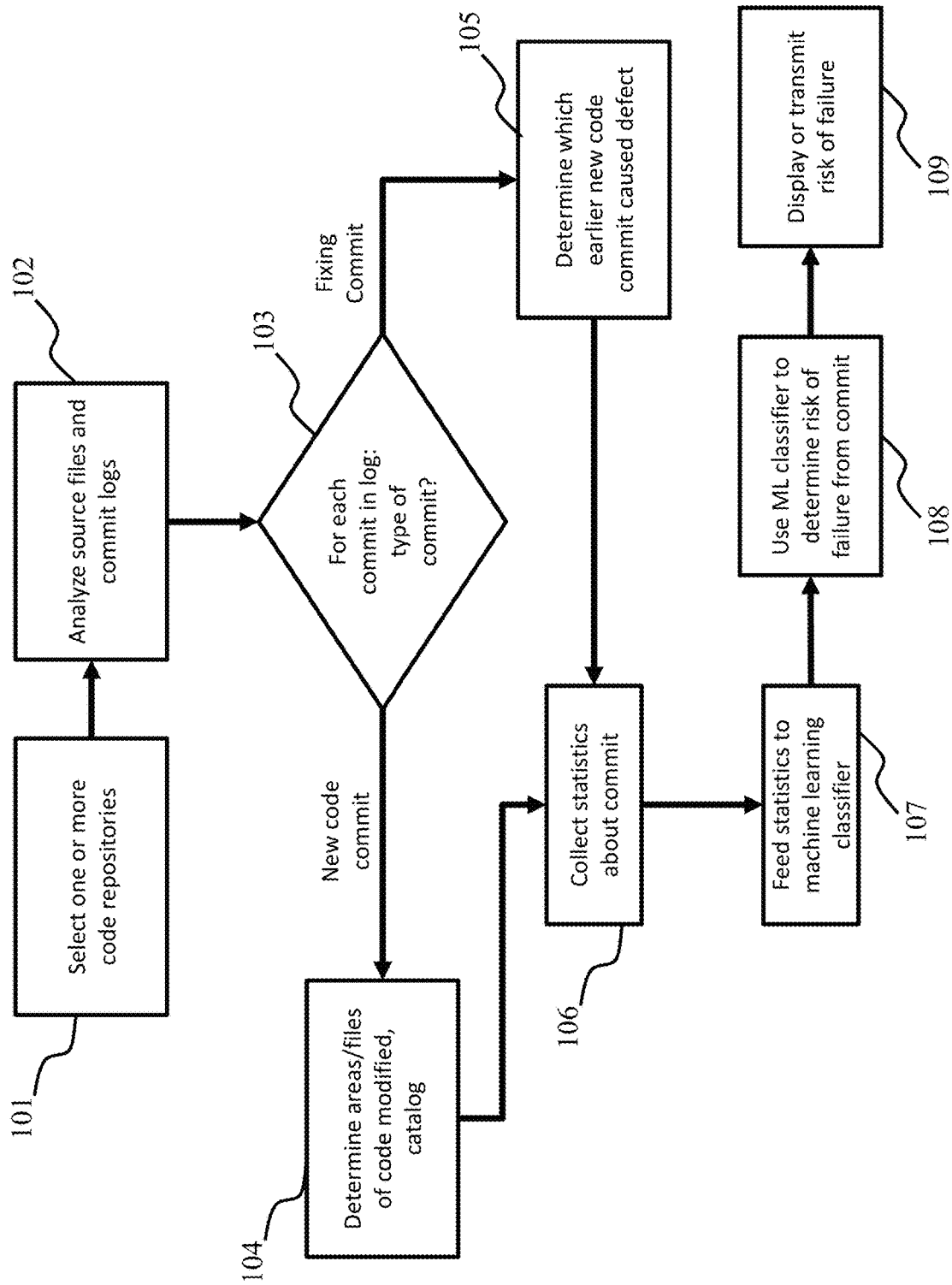
FIG. 1 is a method of training a machine learning algorithm to calculate a failure probability of a code change.

It is to be understood that the figures and descriptions of the present invention have been simplified to illustrate elements that are relevant for a clear understanding of the present invention, while eliminating, for the purpose of clarity, many other elements found in related systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

In some aspects of the present invention, software executing the instructions provided herein may be stored on a non-transitory computer-readable medium, wherein the software performs some or all of the steps of the present invention when executed on a processor.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C#, Objective-C, Java, JavaScript, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G or 4G/LTE networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

Certain aspects of the invention relate to software version control systems. Different examples may be explained using a particular version control system, for example Git. However, it should be understood that the systems and methods disclosed herein are contemplated to be used with any version control system, including but not limited to a client-server based system, for example Concurrent Versions System (CVS), Subversion (SVN), Vesta, Helix Core, Vault, Microsoft Visual SourceSafe, or the like. The systems and methods disclosed herein may also be used with distributed version control systems, including but not limited to Microsoft Team Foundation Version Control (TFVC), Microsoft Team Foundation Server (TFS) ArX, Bazaar, BitKeeper, Git, GNU arch, Mercurial, Perforce, DCVS, Microsoft Visual Studio Team Services, or Azure DevOps Server. The systems and methods disclosed herein may also be used with any implementation of Git, including but not limited to GitHub, BitBucket, Gitlab, and SourceForge.

As used herein, the term "commit" refers to a change made to one or more software files by one or more developers, originally made only to the developer(s) local copy of the code but has now been "committed" or "merged" to the central code repository accessible by other developers or the general public.

The term "commit message" refers to the messages submitted by one or more developers during a commit, and the central repository in which the messages are stored. Typically when a developer commits a change to a central code repository, they do so with a brief, timestamped commit message explaining the change. The central code repository in turn collects these commit messages, accompanied by details of the commit (files changed, lines added/deleted, author, date/time) into a commit log.

Aspects of the present invention may be integrated with or used in conjunction with various Software Development Environments (SDEs) or Integrated Development Environments (IDEs). Examples of suitable development environments include, but are not limited to, Eclipse, NetBeans, Microsoft Visual Studio, or the like.

Code Change Risk Assessment

In a first aspect, systems and methods of the invention may calculate a prediction that a particular code change or "commit" contains a bug, based on a variety of factors, including but not limited to the past history of changes to the code base, whether the author of the change has changed the same file previously, the scope of the change (e.g. number of lines of code in the commit, number of files changed in the commit, number of subsystems changed in the commit), the author of the commit, the time of day and day of the week the change was made, the age of the code changed, the complexity of the code being changed, the number of other people changing the same file or folder within a short time, the coding language used, the author's confidence in the change as determined using natural language processing (NLP) of the commit log message, and the task being completed by the developer based on NLP of the commit log message. A system may use this prediction, sometimes presented as a risk factor, to determine which test or tests from a list of automated tests to run. The system may in some embodiments also produce a graphical representation of risk across one or more files in the code base to recommend where to prioritize manual testing. In some embodiments, the graphical representation may comprise a heat map. In other embodiments, the graphical representation may comprise a table indicating the risk factor of the change and/or the amount of change in each area of the code.

In some embodiments, a method comprises the step of first analyzing a code repository comprising one or more source files and commit logs to build a model of risk factors that have caused defects in the past for each code repository. For each commit in the commit log, a method may determine whether the purpose of the commit was to add new code (a "new code commit") or to fix a bug ("fixing commit"). A system or method of the invention may make this determination based on a variety of factors including but not limited to: natural language processing of the commit message, defect lists from defect management tools, comparison of the change to other changes with known purposes, and a classification of a task type of the commit, for example whether the change is a UI/API change, and/or whether elements are being removed, added, moved, or renamed in the UI/API/backend. In some embodiments, as discussed above, a task type may be determined at least in part by applying NLP to the commit message.

In some embodiments, a system or method of the invention may use a parser, for example coAST, AST, or Antlr to parse commit messages and/or commit logs. Such parsers may be used, for example, to find language-specific information such as packages or libraries. Similarly, methods of the invention may include the step of converting code excerpts or code changes into "trees," and removing information specific to the particular software (for example variable and method names) in order to genericize the code excerpt or code change, then to compare two genericized code excerpts or code changes and determine how similar the code excerpts and/or code changes are.

If a commit is determined to be a "fixing commit", a system may determine which earlier "new code commit" caused the defect. In some embodiments, a fixing commit may be associated by default with the most recent previous new code commit made by the same developer. In some embodiments, the causing new code commit may be determined based on bugs pulled into the system from bug trackers, or bugs created from tests to find commits which cause defects.

Once each commit has been classified, certain methods collect statistics for each commit in order to train a machine learning model of risk. Statistics gathered include, but are not limited to, natural language processing of commit message and code comments to determine developer sentiment and/or confidence in the code change, (for example by scanning for obscenities or spelling errors), functional areas of the code changed, whether the same author has changed the same file previously, the number of dependencies, number of lines of code changed, number of files changed, author of the commit, time of day and day of the week the change was made, age of the code changed, number of other people changing the same file or folder within a short time, coding language used, commit messages or code marked with "to do/todo," "redo," "refactor," "rewrite," or similar phrases indicating that additional work is required. In some embodiments, the machine learning classification model may be unique to the repository, in some embodiments all or part of the machine learning classification model may be shared across multiple repositories. In some embodiments, all or part of the machine learning classification model may be specific to one or more developers within a development team.

An exemplary method of the invention is shown in FIG. 1. The method includes the steps of selecting one or more code repositories for analysis in step 101, analyzing the source files and commit logs in the repositories in step 102, for each commit in the commit logs, determining the type of commit in step 103, for new code commits, determining the areas/files of code modified by the commit and cataloging the commit as modifying those areas/files of code in step 104, for fixing commits, determine which earlier new code commit caused the defect in step 105. The method then includes the steps of collecting statistics about the commit in step 106 and feeding the statistics to a machine learning classifier in step 107, before returning to step 103 to analyze the next commit in the commit log. The machine learning (ML) classifier is then used to determine a risk of failure from the commit in step 108, and the risk of failure is then transmitted or displayed in step 109, which may for example comprise displaying risk of failure in a heat map or transmitting information about the risk of failure to one or more stakeholders, including developers or managers.

Once the classification model is trained, a system or method of the invention may use the classification model to determine the likelihood that one or more commits contains a defect. This determination may be made in some embodiments after each commit, or in other embodiments only after commits that meet certain criteria, for example number of lines/characters changed, identity of developer making the change, etc. The likelihood in turn may be used to calculate a risk factor to determine how widely to run automated tests, and which tests to run. In some embodiments, if a commit has a risk factor above a certain threshold, a system or method may notify some or all users that a new "high risk" commit has been added to the code repository.

In some embodiments, a system may include a risk mapping system. A system may for example display a heat map of all the commits during a selected time period showing the risk of each and the functional areas of the code affected. Such a system may use the number and likelihood calculations of "high-risk" commits in each functional area of the code to show which areas of the code base have the highest risk. Such a map can be used by testers to prioritize their manual testing. In some embodiments, a system may display a chart where each functional area of code is displayed with a size proportional to the size of the functional area out of the entire software (for example based on number of files or lines of code). The chart is then shaded to indicate the files within the functional area that have high risk changes, medium risk changes, low risk changes, and no changes.

Predictive Test Selection

In certain embodiments, a method of the invention may determine the probability of each test in a list or suite of tests failing due to a defect in a new code commit, and selectively runs tests whose calculated probability of failure exceeds a predetermined threshold. Such methods in most cases eliminate the need to run most tests in the test suite, for example tests that cover parts of the code that haven't changed. Although existing methods claim to exercise this functionality, the disclosed systems and methods are superior, because existing methods are either limited to choosing groups of tests rather than individual tests, and existing methods also fail to examine commit messages as an input to the system. Some methods merely examine the code and changes made to the code, and are therefore language-dependent, whereas the disclosed systems and methods are agnostic to language because of their additional use of developer-provided commit messages and logs.

The systems and methods described herein may use any or all of a variety of methods for monitoring a code repository for new commits. One example is an application programming interface (API) callback, for example a webhook API, wherein a server overseeing a code repository transmits a function call or other message to notify a system of the invention that a new commit has taken place. In other embodiments, a system or method of the invention may poll the code repository to detect changes. In one embodiment, a system of the invention uses a combination of webhook data, API call or agent executing commands on the repository to get the commit metadata in Git (or other code repository) to determine which files or lines of code have changed. The system may then determine which tests to run based on the changes, and send the list to a continuous integration (CI) system or directly to a test runner to execute the selected tests and return the results. In some embodiments, a system or method of the invention may use junit, xunit, or another result file, API or tool to receive or read the results.

As detailed above, tests may be selected individually from a suite of tests. In some embodiments, a method of the invention may include the step of dividing the code base into one or more regions or areas, then assigning one or more tests to each region of code, where the test or tests act to validate the one or more regions of the code to which they are assigned.

In some embodiments, a failure detected in a test selected by a method of the invention may be used to augment one or more methods of the invention. For example, in some embodiments, both new test failures (failures by tests selected by a machine learning model trained by the invention) and previous bug fixes may be used to iteratively train the machine learning model.

In various embodiments a system or method may interface with a single code repository for a project, or may support interfacing with multiple code repositories for the same or different projects simultaneously in order to improve results. In some embodiments, a system or method may interface with multiple code repositories, some of which are of a different type of repository. In some embodiments, a system or method may support monitoring multiple different types of source file within the same or different repository.

In one exemplary embodiment, a method of the invention includes the steps of connecting to one or more code repositories. The connection may be accomplished in different ways in different embodiments depending on where the system is installed. In embodiments where a system of the invention is installed in a cloud configuration, software executing instructions to perform one or more methods of the invention may be installed on outside, cloud-hosted infrastructure, separate from infrastructure hosting the code base. A webhook or polling mechanism connects to the code repository to learn of new commits. In embodiments where a system of the invention is installed on premises of a user, software may be installed on infrastructure controlled by the user or on a cloud product. In such embodiments, a webhook or polling mechanism may be used to connect to the repository to learn of new commits. In some embodiments a hybrid arrangement may be used, wherein an agent is installed on infrastructure controlled by the user, where the agent uses a webhook or polling mechanism to gather data of new commits. The collected data may then be forwarded to a second system executing software in a cloud instance. Details of one or more commits may be gathered either via webhook, API, an agent running repository commands or a combination of these depending on the configuration. In some embodiments, a CI server or other application monitoring the code repository may make an API call when a new commit is received in order to query a system of the invention to determine which test or tests to run.

Figure 2:
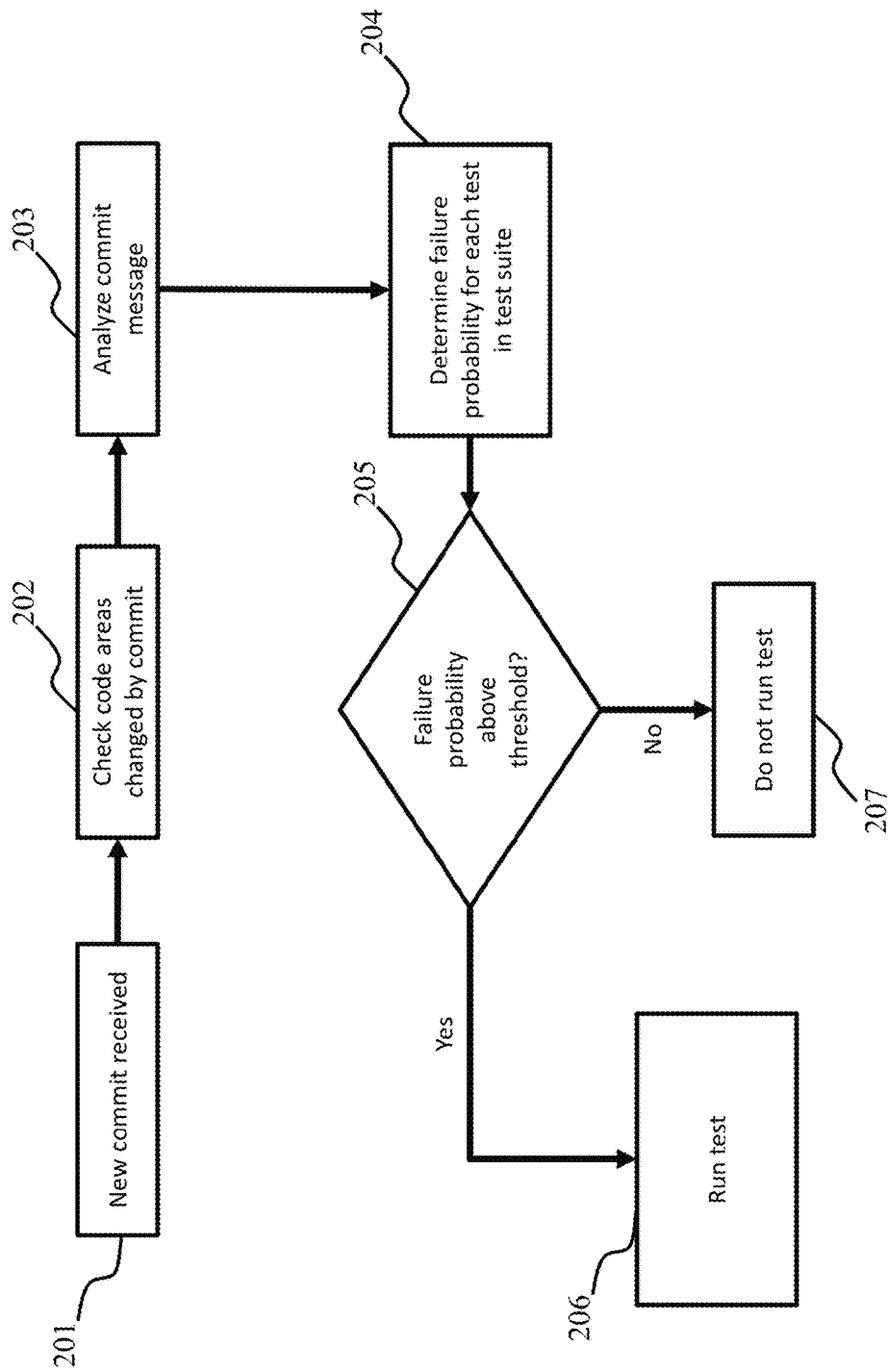
FIG. 2 is a method of determining whether to run a test in a test suite.

One exemplary method is shown in FIG. 2. The depicted method includes the steps of waiting for a new commit to be received by a code repository in step 201, checking which areas of code were changed by the commit in step 202, analyzing the commit message in step 203, determining, based on the commit message and the code areas changed, the probability that the commit will fail each test in a suite of tests in step 204, checking whether the calculated failure probability exceeds a threshold in step 205, then, if the failure probability exceeds the threshold, running the test (206), and if the failure probability does not exceed the threshold, do not run the test (207).

In some embodiments, until a machine learning model is trained, an initial mapping of groups of tests to areas of code is used for a heuristic model to determine the set of tests to run. A heuristic model for use with a method of the invention may be generated manually during setup by matching one or more tests to functional code areas. In some embodiments, part or all of the heuristic model may be generated automatically with a system to match the test groups to functional code areas based on correlations between the names. In some embodiments, a test may be associated with a code area based on what area or areas of the code base were modified most recently prior to the test being run. A machine learning model will eventually build a finer-grained mapping of individual tests to individual files and regions of the code base. However, a heuristic model provides significant benefit immediately and could in some embodiments be used by a method of the invention by itself even without a later trained machine learning model. In some embodiments, a system or method of the invention will use the heuristic model until the accuracy of the machine learning model exceeds that of the heuristic model.

Accuracy of the heuristic model versus the machine learning model may be evaluated continuously, for example by comparing the accuracy of the heuristic to the model, and using the measurement to determine whether to use the model or the heuristic.

In some embodiments, a heuristic model may be assembled by splitting one or more test names into pieces and comparing those pieces to file names split into pieces and areas split into pieces. Where the test segments match files/area segments, the tests may then be automatically associated with these files/areas. For example, a test might be named "Test accounts cannot have a negative amount unless in overdraft," which might in some embodiments be automatically or manually linked to source files named "accounts.java" and/or "accountOverdraft.java."

A machine learning model of the invention in some embodiments comprises a classification model built using the automated test results (manual test results may in some embodiments be used in the same way if the test results are manually imported into the system or using data from test case management tools). The machine learning model may use some or all of the following inputs to calculate a probability of failure for each test in a test suite.

In some embodiments, a machine learning model may use test results, for example whether the test passed, failed, was broken, or did not run. In some embodiments, a machine learning model may additionally or alternatively consider whether a test went from passed to failed, failed to passed, passed to broken, failed to broken, broken to passed, or broken to failed, as a result of a commit. In some embodiments, a machine learning model may use a calculated or returned assessment of a defect type. Examples of defect types include, but are not limited to, code, flaky, invalid test, or outside scope. In some embodiments, a machine learning model may use the failure message returned in addition to an error code. Some embodiments may use the test area, which may in some embodiments refer to the test suite name or class name of the test, for example from an xunit/junit result file.

Some embodiments use information stored in the code repository or commit logs related to caused-by and closed-by commit files changed. "caused-by commit" is the commit or set of commits that is suspected of being the cause of a particular defect/test failure/break. For example, if Test 1 passes on commit 1, isn't run on commit 2 and fails on commit 3, it is unclear whether commit 2 or commit 3 caused the test to fail, so the "caused-by" commits are commit 2 and commit 3.

"Closed-by commit" is the commit or set of commits that is suspected of causing the defect to be fixed as determined by the test result changing from failing/breaking to passing. The closed by commit or commits are determined similarly to the method for determining the caused-by commits outlined above, except that the Test in question goes from failing to passing. The caused-by and closed-by commits may be in one repository or spread across multiple separate repositories because the test or tests run can be linked to commits in multiple repositories. In some embodiments, a system may automatically determine the caused-by/closed-by commits based on changes in test result, for example, when a test fails after a given commit is applied, and when the same test passes either before the commit was applied or after the commit is rolled back. In some embodiments, a machine learning model may use the caused-by and closed-by commit areas and files changed.

In one example, if the caused-by commits are commit 2 and commit 3, and the commits change file 1 and file 2 which are part of area 1 and area 2, this information can be used to work out which other tests may be essentially associated by the model or heuristic with these files or areas. Additionally, the closed-by commits may be used, or the caused-by closed-by union of files. In a further example, if commit 4 is the closed-by commit which changes only file 1 and area 1, the model/heuristic is able to determine that it is more likely that file 1 and area 1 are the cause of the failure, when compared to file 2 and area 2.

As briefly mentioned above, in some embodiments a machine learning model may use the name of the test itself as an input, for example splitting the test name or test suite name or test class name into substrings or individual words and mapping those substrings to individual files or areas of code. Test names, class names, or suite names may optionally be imported from junit, xunit, or other test reporting systems. Additionally, the machine learning model may use the commit message or a substring of the commit message as an input.

Substrings may in some embodiments be determined by stemming and/or lemmatizing an input string, that is, to computationally determine the word stem of one or more words in the string. The word stems so determined may then be compared to other word stems in other inputs to the system, for example to the names of source code files or source code areas, in order to determine matches. For example, a method may make connections between a test which mentions "playing" and a file called "play.java" by using the stem of the word "playing."

As detailed above, in some embodiments a machine learning model may include a calculation of the riskiness of a particular code change or commit. This calculated riskiness may in some embodiments be used as an input to a machine learning model.

Additional factors which may be used as inputs to a machine learning model include, but are not limited to, the recent history of the test (for example the test pass rate in the past 5 runs, 10 runs, 20 runs, 30 runs, 100 runs, or chronologically for example the past one hour, two hours, six hours, or 24 hours), and code coverage of the test, for example code coverage determined by a tool such as jacoco. Additional inputs may include the files/areas changed in the commit, dependencies in the code, test result messages and logs, and mentions of files or specific code areas in the test result messages/logs. In some embodiments, tests may be filtered based on the likelihood of a test failing when another test fails. For example, if test B always fails when test A fails, there is no need to run test B after test A has failed. Additional inputs may include one or more logs, including commit logs, logs related to fixing commits or closing commits.

Mutation testing can also be used to increase the accuracy of the a machine learning model disclosed herein. Mutation testing mutates the code to cause tests to fail. The model can then use which change caused which test to fail as a way of generating the mapping. Mutation testing as understood in the art is used to design new software tests and evaluate the quality of existing software tests. Mutation testing involves modifying a program in small ways. Each mutated version is called a mutant. Tests detect and reject mutants by causing the behavior of the original version to differ from the mutant.

Test Selection

Based on the risk probabilities and other calculations detailed above, a method of the present invention may return a list of one or more tests to be run. The list of tests may be prioritized, for example with a highest priority being attached to a test which has a higher probability of failure and a shorter estimated time to run. In some instances, a lower priority may be attached to a test which has a lower probability of failure and/or a longer estimated time to run. A user may also provide parameters for a desired test scope.

In one exemplary embodiment, high priority tests as determined by a heuristic model may comprise tests which cover the files that have changed by a recent commit or commits. In some embodiments, high priority tests as determined by a machine learning model may comprise tests with a high probability of failure as determined by the methods disclosed herein.

In one exemplary embodiment, medium priority tests as determined by a heuristic model may comprise tests which cover the areas of the code that have changed, while medium priority tests as determined by a machine learning model may comprise tests that are unlikely to fail, but have a higher failure probability than a predetermined threshold. In various embodiments, a predetermined probability threshold for medium priority tests may be 50%, 40%, 30%, 20%, 10%, 5%, 0%, or any number in between.

In one exemplary embodiment, low priority tests as determined by a heuristic model may comprise tests which do not cover the areas of the code that have changed, while low priority tests as determined by a machine learning model may comprise tests that have a close to 0% probability of failure as determined by the methods disclosed herein, for example a less than 20%, less than 15%, less than 10%, or less than 5%.

In one exemplary embodiment, unassigned tests as determined by a heuristic model may comprise tests which have not been assigned to a code area, while unassigned tests as determined by a machine learning model may comprise tests which have no history of failure in the machine learning model, or tests where the model is unable to determine whether the test is going to fail or not. In one embodiment, a classification model includes tests which are in the middle of the range from 0 to 1 with 0 to 0.3 being unlikely to fail, 0.3 to 0.7 being tests with an unknown certainty of failure and 0.7 being tests that are likely to fail.

In various embodiments, a user may select to run X number of tests, and a method may return a list of the X highest priority tests, or may alternatively run and return the results of the X highest priority tests. In some embodiments tests may be ranked based on the likelihood of finding a bug divided by the average execution time of the test. In other embodiments, a user may select to test for T amount of time, and a method may return a list of tests with a total estimated run time less than T, containing the set of tests most likely to find a failure in that time. In some embodiments, a method may return a list of the highest priority tests whose cumulative estimated run time is less than time T or about time T. In some embodiments, a method may return a list of the highest priority x tests, where x is given as a percentage of the total available tests. In some embodiments, a method may return a list of the minimum number of tests to be x percent confident that all bugs in a commit will be identified. In some embodiments, the method may run the selected tests as described above and return the results. In other embodiments, a method may include sending a list of selected tests to another application or service to run the tests, for example a CI tool or a test runner, which may then run the tests and either return the results directly to a method of the invention, or produce a results file or log which is read and interpreted by a method of the invention.

After the test results are received, in some embodiments any failures may be categorized based on the condition the failure indicates. For example, one category is a code defect, indicating a bug or defect in the code. Another category is a flaky failure, for example a failure of the test itself instead of a failure related to the code. In another example, a flaky failure may be a failure from a test evaluating a part of the application that is itself flaky or non-deterministic—i.e. a part of the application may work in one way at one time and in a different way at a different time. Another category is an invalid test, where one or more tests may no longer be valid due to changes in the code, for example where a change in the code has now made the test out of date, and the failure is expected. Another category is that the failure is outside scope, meaning that the failure returned by the test is outside the scope of what the test was attempting to validate.

Finally, after the test results are received and compiled or categorized, a method of the invention may include the test of determining whether to pass or fail a version of the code repository based on one or more parameters, for example whether there were any code defects, flaky failures, invalid tests, outside scope test failures returned, or whether the test failures/bugs are new/reopened or have previously occurred. The version of the code repository tested may be the most current version of the code repository or may be a previous version of the code repository being tested. In some embodiments a method of the invention may include the step of building or directing another system to build/compile/link/assemble the code repository into a functional application or debug configuration for proper testing. In some embodiments, a method may include the step of building/compiling/linking/assembling a previous version of the code repository into a functional application or debug configuration to more precisely determine which commit cause the failure, and to be more precise in future predictions.

In some embodiments, based on the above-mentioned factors, a method of the invention may calculate whether a failure in one or more tests was intended by the developer who made the caused-by-commit. For example, if a commit message states that the developer was "changing title of page from Apple to Banana" and the test is called or has a test step or a failure message which says "Check page title is equal to Apple," a method of the invention may match what the test is trying to do back to the change and validate that the test is no longer valid as the change is supposed to break the test. By filtering out and ignoring failures that were intended, methods and systems of the invention can more accurately determine whether the failure is something that needs to be fixed, which can assist with further methods related to task assignments and developer performance metrics, explained in more detail below. The accuracy of machine learning mapping is further aided by filtering out the above-described test failures that are not caused by code defects. Such filtering leads to additional functionality, including flaky failure detection and quarantining and an automatic bug tracking system as detailed below. The defect filtering functionality is useful to increase the accuracy of mapping, but in some embodiments the mapping will work without this filtering functionality. Defect filtering may additionally be useful unto itself, as it can help identify which tests need to be investigated or fixed.

Flaky Failure Detection

In some embodiments, a method of the invention includes a process for detecting when a test failure is a "flaky failure" as described in more detail above. In some embodiments, a method may include a heuristic analysis of failures, including the step of automatically re-running any failed tests a specified number of times. In some examples, if a test passes once on retry, the failure is determined to be flaky. In some embodiments, a failed test may be re-run 1, 2, 3, 5, 10, or more times to determine whether the failure was a flaky failure.

In other embodiments, a machine learning classification model may be used to determine whether or not a test was a flaky failure. The model analyzes test results in detail and compares the test results to previous results to determine if the failure was flaky or not. The model compares new failures to the previous failures based on factors including but not limited to the following. The average run time of the test when passing vs. run time for the measured failure (for example, if a test typically takes 1 minute to run and the failure occurred after 5 seconds, it is highly likely that something went wrong setting up the test itself, indicating a flaky failure.). Other factors include the test name, test code areas, test class name, test suite name, defect type, test result type, defect failure message, logs (including commit logs and commit messages), area or areas of the code changed, and files of the code changed.

In some embodiments, a machine learning model may include the recent history of the test, including how many different results and changes in result the test has had over the last N runs. In some embodiments, N may be 5, 10, 25, 50, or 100 runs, or any number in between. A badly written test that causes flaky failures may have a history of occasional random failures. Other embodiments may use individual stemmed and lemmatized words from the various parameters listed above, including but not limited to logs, testname, testsuitename, and classname. The stemmed and lemmatized words are then searched for a variety of terms including in some examples the words or phrases "add," "remove," "change," "displayed," "not displayed," "enabled," "disabled," "not enabled," "not found," and/or "clickable." In some embodiments, individual words searched may vary from test to test, as different tests may be targeted toward different functionality or features. In some embodiments, a machine learning model may include data related to whether or not there were other failures in the test run.

In some embodiments, a machine learning model may include information about the similarity of a particular commit to other commits as determined and discussed above. Such models may further incorporate information related to test failures resulting from commits calculated to be the same or similar to the commit or commits being analyzed. Information about a particular commit or commits may further comprise information related to "sub commits," i.e. when either the commit being investigated contains other commits, or other commits contain the commit being investigated.

In some embodiments, a machine learning model may include information related to similarity between one or more commit files, commit messages, libraries/packages etc. used in the commit, and test details, for example test name, test classname, and testsuitename. In some embodiments, similarities among one or more of the aforementioned parameters may be calculated via fuzzy search.

In some embodiments, defect results can be manually updated by the user to correct the defect type, allowing the machine learning model to be adjusted.

System for Automated Bug Tracking

In some embodiments, a method or system of the invention may include a method of automated bug tracking. When a test fails due to a code defect, a method may automatically open a defect report for tracking. Defect reports may either be used exclusively by the methods disclosed herein, or may alternatively be transmitted to an outside bug tracking system. The report in some embodiments groups test failures into defects. For example, one code defect may cause multiple tests to fail, and so in some embodiments a method of the invention one or more test failures may be grouped in a defect report, by the suspected bug or code defect that caused the failure. This is a significant improvement over current failure reporting mechanisms which simply return a list of failures, sometimes grouped by the source file or library from which the error originated.

Because a useful feature of the methods disclosed herein is to inform developers of defects in their code changes, a method can in some embodiments be configured to prevent a software build from breaking (i.e. failing to compile or run as intended) due to the failure of any test caused by an already open defect. All tests that are expected to fail from open defects can be run on every test cycle together with the selected tests for new changes. When tests subsequently pass, it is then known that the defect has been fixed, and can be automatically closed. Bug tracking information can in some embodiments be sent to an issue tracking management tool such as Jira. In some embodiments, a method includes the step of sending a to do list to the developer/tester based on the defect type. Where code defects are shown as prioritized defects to investigate, and other defects (such as invalid test defects) are sent as to be potentially looked at. In some embodiments, multiple test failures may be grouped together into one or more discrete "defects." In situations where a single code defect may cause multiple tests to fail, it may be advantageous to display only the one code defect instead of the list of test failures caused by that code defect.

System for Evaluating Developer Efficiency Based on Test Results

The disclosed methods and systems in some embodiments include generation of metrics based on individual developer efficiency and quality. This data can be generated because the disclosed methods see and parametrize all changes made by all developers and the corresponding results of automated tests and/or any imported manual test results or defects imported from defect tracking systems. The quality of code written by individual developers may therefore be quantified based on automated test results and the machine learning and heuristic models disclosed herein. In some embodiments, a disclosed method can track developer habits that are leading to good and bad code, thereby providing feedback that can improve developer performance. A method may in some embodiments generate separate metrics for each code area or task type to help find the best developers for different types of projects, thereby optimizing task assignments in a way that is not currently available using known methods and systems. The disclosed methods may also be used to optimize team formation.

In some embodiments, a developer productivity metric may be calculated based on factors including the riskiness of one or more code changes, calculated by the code change risk assessment described above; the time taken by the developer to write code, and/or the number of defects created when making particular changes.

In accordance with this productivity metric, a method of the invention may include automatic generation of awards for developers. These awards may in some embodiments be designated separately for different areas of code or different task types, and may include awards for developers who were most productive during a specified time period, improved their productivity the most over a specified time period, or created the fewest defects over a specified time period. Task types include, but are not limited to adding functionality, fixing, performance, security, refactoring, changing UI, changing API, adding to UI, adding to API, etc.

The above mentioned productivity metric may additionally be used to improve task assignment based on the developer productivity metrics for different areas of code, or for a particular task type. A method may for example include the steps of calculating a developer productivity metric for one or more developers based on either the area of code being changed or type of change, ranking developers based on the calculated developer productivity metric, and using the rankings to determine the best overall task assignment. For example, a genetic algorithm or similar could look at a set of tasks and determine the best assignment of tasks to reduce the total development time. This algorithm could calculate the estimated results of different task assignment strategies until it finds the best assignment.

Figure 3:
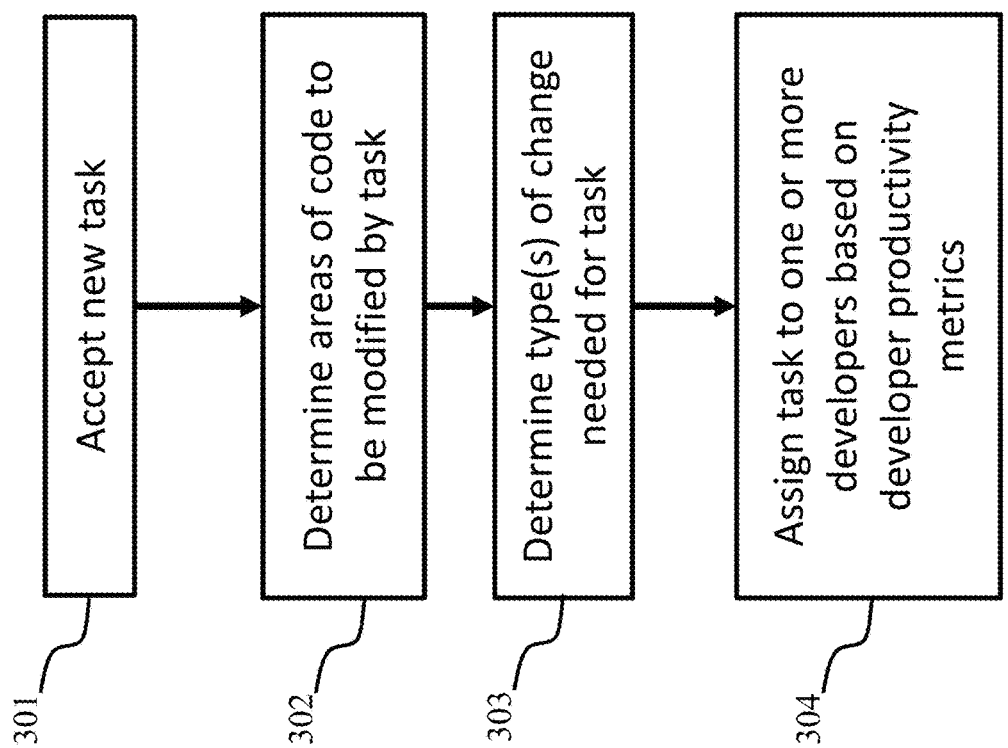
FIG. 3 is a method of assigning tasks to developers based on developer productivity metrics.

One exemplary method is shown in FIG. 3. The method includes the steps of accepting a new task in step 301, determining areas of code to be modified by the task in step 302, determining the types of change needed for the task in step 303, and assigning the task to one or more developers based on developer productivity metrics related to the code areas and task types in step 304.

Developer metrics may also be calculated for groups of developers when working together, for example to assist in improving team formation. A method may for example determine which developers work best together based on which developers committed changes to a particular file, then finding who changed the same file afterwards and determining if there is an improvement and if code is written faster and/or more efficiently by the two or more developers working in tandem. An exemplary method may include the steps of, analyzing a productivity metric of Developer 2 when changing code recently changed by Developer 1, analyzing the same or a different productivity metric of Developer 2 when changing code not recently changed by Developer 1, and performing the same steps for Developer 1 with respect to code recently changed by Developer 2. From these combined productivity metrics, a method of the invention may identify developers who have higher productivity metrics when working together and recommend teams with the highest combined productive metrics possible. In some embodiments, a method may intentionally pair a developer having a low productivity metric with a developer having a high productivity metric, where the two developers together have an acceptably high productivity metric, in order to facilitate an efficient mentoring relationship.

In another embodiment, developer productivity metrics may be used to determine the value of refactoring a section of code (i.e. restructuring or significantly rewriting the section of code without changing its external behavior) based on the expected improvement of output, and selecting the developer or developers most likely to successfully and efficiently refactor the section of code in question. In one embodiment, such a method may include the steps of calculating productivity for all commits which change a specific file, calculating productivity when not changing the specific file, ranking files in order of difficulty to change, and calculating, based on average productivity vs current productivity when changing the specific file, or the factor by which overall development efficiency is expected to increase after refactoring the file or files. The method may in some embodiments take as an input the number of commits that changed the file or files during a specified time period to determine the amount of time that could have been saved by a refactor. In some embodiments, the method may take as an input a set of expected changes/commits for a project or release and then determine how much time could be saved by refactoring. The method could then determine whether the refactoring effort would save more time than the time taken for refactoring.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method of calculating a failure probability of a change in one or more source code repositories, comprising:
    selecting the one or more source code repositories;
    analyzing the source files in the source code repositories;
    analyzing at least one commit made to the source code repositories, the commit comprising one or more changes to the source code and a commit message;
    determining a type of the commit selected from the group consisting of a fixing commit and a new code commit;
    if the commit is a new code commit, determining a set of areas of source code modified;
    if the code is a fixing commit, determining which commit of a plurality of new code commits is a causing commit, which caused a defect affiliated with the fixing commit, and determining a set of areas of source code modified by the causing commit;
    analyzing the commit message and calculating one or more parameters of the commit message;
    if the commit is a new code commit, training a machine learning classifier with a set of data comprising: the type of commit, the set of areas modified, and the commit message;
    if the commit is a fixing commit, training the machine learning classifier with a set of data comprising: the type of commit, the causing commit, the set of areas of source code modified by the causing commit, and the commit message; and
    using the machine learning classifier to calculate a probability that the commit will cause a failure in the source code repository.

2. The method of claim 1, further comprising the step of stemming and lemmatizing the commit message.

3. The method of claim 1, wherein the set of data further comprises the closing commit, a list of files modified, a set of similarly named files, folders, areas, and a list of files and areas associated with the test.

4. The method of claim 1, further comprising calculating a set of probabilities that parts of a commit will cause a failure.

5. The method of claim 4, further comprising displaying a heat map representing the set of probabilities.

6. The method of claim 4, further comprising stratifying the set of probabilities into high risk, medium risk, low risk, and no change.

7. The method of claim 1, further comprising transmitting a message to one or more recipients if the calculated probability exceeds a threshold.

8. The method of claim 1, further comprising:
    removing variable and method names from the changes to the source code in the commit to generate a genericized source code change; and
    comparing the genericized source code change to other genericized source code changes.

9. A method of determining whether or not to run a test on a code repository, comprising
    obtaining a set of caused-by commits and a set of closed-by commits, each comprising a set of regions of a code repository modified and an associated defect;
    calculating a union of the set of regions modified by the caused-by and closed-by commits associated with each defect and associating the unions with each associated defect;
    training a machine learning model with the unions as an input designated as high-risk code regions;
    obtaining a set of tests, each test being associated with at least one region of the code repository;
    receiving at least one new commit to the code repository;
    determining which areas of code are changed by the commit;
    analyzing a commit message associated with the commit;
    determining a failure probability for the test using the machine learning model;
    comparing the failure probability to a threshold; and
    for each test in the set of tests, if the failure probability exceeds the threshold and the test is associated with the high-risk region of the code, running the test.

10. The method of claim 9, further comprising determining whether a failure of the test will be unique.

11. The method of claim 9, further comprising calculating a likelihood of whether the test will cause a unique failure.

12. The method of claim 9, further comprising recording whether the new commit caused the test to change state, wherein the state is selected from the group consisting of passed, failed, and broken; and
    using the state change information in a future iteration of the failure probability determining step.

13. The method of claim 12, further comprising recording a failure message returned by the test if the test fails; and
    using the failure message returned by the test in a future iteration of the failure probability determining step.

14. The method of claim 12, further comprising:
    if the new commit caused the test to change state from failed to passed, recording the commit as a "closed-by" commit.

15. The method of claim 9, further comprising generating a list of tests to be run on the code repository.

16. The method of claim 15, wherein the list of tests of be run is a list of a predetermined number of highest priority tests.

\* \* \* \* \*